United States Patent Office 3,287,374
Patented Nov. 22, 1966

3,287,374
NOVEL FURAN COMPOUNDS AND PROCESSES FOR PREPARATION
Andrew P. Dunlop, Riverside, and Daniel S. P. Eftax, Barrington, Ill., assignors to The Quaker Oats Company, Chicago, Ill., a corporation of New Jersey
No Drawing. Filed Aug. 15, 1963, Ser. No. 302,435
4 Claims. (Cl. 260—347.4)

This invention relates to new and useful compounds of the general formula, hereinafter referred to as Formula A,

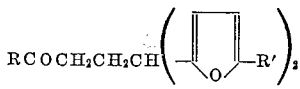

wherein R is lower alkyl and R' is hydrogen or lower alkyl, to certain derivatives of said compounds, and to processes for preparing said compounds and derivatives. As used herein, the term "lower alkyl" is intended to include alkyl substituents having less than five carbons. In accordance with this invention we have discovered that 2-alkylfuran compounds will react with unsubstituted furan or 2-alkylfuran compounds in the presence of an acid and water, to form compounds having Formula A, above.

Hence, in accordance with this invention, a "trimeric compound" (having Formula A wherein R' is lower alkyl and the R substituent and the R' substituents are all the same) is prepared by a process comprising contacting a compound having the formula

wherein R is lower alkyl with an acid, said contacting taking place in the presence of water.

These products are called "trimeric" in the sense that the formula and the molecular weight of the trimer are exactly three times that of the starting compound. Hence, when 2-n-butylfuran (MW 124.18) is treated in accordance with the process of this invention 1,1-bis(5-butyl-2-furyl)octane-4-one (MW 372.54) is produced. Likewise, 2-propylfuran (MW 110.154) is converted to 1,1-bis(5-propyl-2-furyl)heptane-4-one (MW 330.362), 2-ethylfuran (MW 96.127) is converted to 6,6-bis(5-ethyl-2-furyl)-hexane-3-one (MW 278.371), and 2-methylfuran (MW 82.10) is converted to 5,5-bis(5-methyl-2-furyl)pentane-2-one. The latter compound has the structural formula

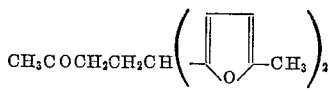

and is hereinafter referred to as Compound I.

We have likewise discovered that a mixture of compounds having Formula A, in which the R group and the R' groups are different, may be produced by contacting a mixture of 2-alkyl substituted furans with an acid, said contacting taking place in the presence of water. Hence a mixture of 2-ethylfuran and 2-propylfuran and 2-butylfuran produces a complex mixture of compounds having Formula A, such as 1-(5-ethyl-2-furyl)-1-(5-propyl-2-furyl)octane-4-one; 6-(5-ethyl-2-furyl)-6-(5-propyl-2-furyl)hexane-3-one; 1,1-bis(5-ethyl-2-furyl)heptane-4-one, etc., in which the R group and the R' groups may be alike or different in a given molecule.

Likewise, the new and novel compound 5,5-bis(2-furyl)-pentane-2-one is produced in accordance with the process of this invention by a process comprising contacting 2-methylfuran, furan, and an acid, said furan being in an amount greater than two moles per mole of 2-methylfuran, said contacting taking place in the presence of water.

Additionally, we have discovered processes by which several novel and useful compounds which are derived from Compound I are prepared from 2-methylfuran. These processes have the first step in common, namely the formation of Compound I by contacting 2-methylfuran with an acid in the presence of water.

A two-phase reaction product mixture is encountered in those embodiments of this invention which utilize the preferred conditions, herein described, and which do not employ auxiliary solvents. In these embodiments recovery of Compound I may be accomplished by separating the phases. For example, the oily phase of the product of Example I, below, is predominantly Compound I.

Whether or not two phases are encountered, it is preferred that the recovery of Compound I comprise a reduced-pressure distillation of the reaction mixture or, more preferably, of a separated oily phase of the reaction mixture.

The new and useful compound 5,5-bis(5-methyltetrahydro-2-furyl)pentane-2-ol, hereinafter referred to as Compound II, has the structural formula

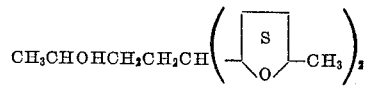

and is produced from 2-methylfuran by a process which comprises contacting 2-methylfuran with an acid, said contacting taking place in the presence of water and preferably at a temperature between about 50° C. and about 150° C., recovering Compound I from the resulting reaction mixture and hydrogenating the Compound I, preferably at elevated pressures (i.e., from about 500 p.s.i.g. to about 3000 p.s.i.g.) and at a temperature between about 30° C. and about 200° C. in the presence of a nickel catalyst, until hydrogenation is substantially complete. The symbol S herein denotes saturation of the ring. This process is further illustrated by, but not restricted to, the combination of Examples 1 and 2, below. As an alternative to recovering Compound I, the reaction mixture is neutralized and hydrogenated as indicated above to obtain similar results.

Moreover, we have discovered that if the above hydrogenation is not permitted to proceed to completion, but instead is terminated after absorption of only one mole of hydrogen per mole of Compound I, the product is a different new and useful compound, namely, 5,5-bis(5-methyl-2-furyl)pentanol-2, hereinafter referred to as Compound III, having the structural formula

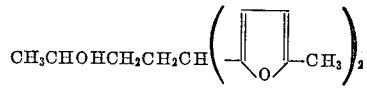

Additionally, we have discovered that Compound III may be produced from 2-methylfuran by an alternative process comprising contacting 2-methylfuran with an acid, said contacting taking place in the presence of water and preferably at a temperature between about 50° C. and about 150° C., recovering Compound I from the resulting reaction mixture, and contacting Compound I with hydrogen, preferably at elevated temperatures (namely, from about 150° C. to about 200° C.) and pressures (namely, from about 500 p.s.i.g. to about 3000 p.s.i.g.) in the presence of a copper chromite catalyst. Compound III is an amber-colored liquid having a molecular weight of 248.32.

Moreover, we have found that Compound I will undergo haloform reactions leading to the salts of 4,4-bis(5-methyl-2-furyl)butanoic acid, said acid being hereinafter referred to as Compound IV and having the structural formula

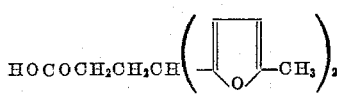

The sodium or potassium salt of Compound IV may be readily hydrogenated to the corresponding salt of 4,4-bis(5-methyltetrahydro-2-furyl)butanoic acid, said acid being hereinafter called Compound V and having the structural formula

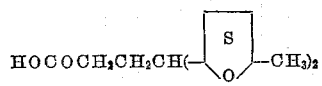

and prepared by contacting the salt with hydrogen in the presence of a nickel catalyst. The symbol S, above, denotes saturation of the ring.

Hence all the processes above by which new and novel Compounds I, II, III, IV and V are prepared have in common the production of Compound I by the process comprising contacting 2-methylfuran with an acid in the presence of water. This is the process by which Compound I is produced. The disclosure of these processes leading to Compounds II, III, IV and V is also intended to illustrate reactions in which compounds having Formula A are used.

The following further information is provided regarding the production of Formula A compounds by the process of this invention:

The medium in which this reaction is carried out can be largely aqueous, or it can be largely a solvent which is stable under the conditions of the reaction. Water, however, must be present in the process of this invention although the amount of water present is not critical. However, in process runs in which there is less than about 1 mole of water per mole of 2-alkylfuran the resulting reaction mixtures are viscous liquid mixtures which provide poor yields of compounds of Formula A. In contrast, systems having a high water to 2-alkylfuran ratio provide excellent yields. For example, systems employing sulfuric acid, in which the water to 2-methylfuran molar ratio is about 30 to 1, provide yields of about 85% of Compound I based on 2-methylfuran converted. Systems in which the water to 2-alkylfuran molar ratios are between about 20:1 and about 40:1 are preferred.

The temperature at which the process of this invention is carried out is not critical. The reaction proceeds under a very wide range of temperature conditions, though it is very slow at room temperature. Temperatures of from about 50° C. to about 150° C. are preferred.

Pressurized systems are obviously necessary when reactions are carried out at a temperature above the boiling point of the system, or above the boiling point of one of the phases of the system. The rate of reaction is greatly increased at elevated temperatures, however. Higher rates of reaction may also be achieved by other means, as for example, more vigorous intermixing of phases, if any, and, for example, by use of solvent systems which are stable under conditions of the reaction and which increase the degree of solution of 2-alkylfuran in the aqueous acid. Suitable solvent systems may include single solvents or mixtures of solvents. Liquid organic acids (such as acetic acid, propionic acid and the like) may be employed as solvents, though temperatures above their decarboxylation temperature are obviously to be avoided. Alcohols which are stable under conditions of the reaction, such as, for example, methanol, ethanol, and propanol, are suitable reaction solvents.

Suitable acids include the mineral acids, such as phosphoric acid, hydrochloric acid, and sulfuric acid. Nitric acid is also suitable but is less desirable because of possible dangerous side reactions. Acids having a pKa value less than 3.0 are generally preferred. Exclusive use of acids having higher pKa values leads to slower reaction rates. We believe this is due to accompanying lower hydrogen ion concentration. Hence, when an aqueous acetic acid solution is employed as the solvent system, it is preferred that a strong acid, such as, for example, sulfuric acid or chloroacetic acid, be present also. Moreover, suitable acids may be supplied in the form of an acidic ion exchange resin, such as, for example, the Rohm and Haas resin XE-100. In general, the lower the pH of the aqueous phase, the faster the rate of the reaction. The concentration of the acid catalyst is not critical. However, concentrations below 1 mole per liter of aqueous solution provide slow reaction. Acid concentrations above 5 molar are preferred.

Insofar as water must be present in the process of this invention, acidic substances which react with water, such as aluminum chloride, zinc chloride and the like, are obviously not suitable if present in sufficient quantity to remove the water from the system.

Based on experimental evidence, we believe the process of this invention is not merely specific for 2-alkylfuran, but is a general one in which the following reaction takes place:

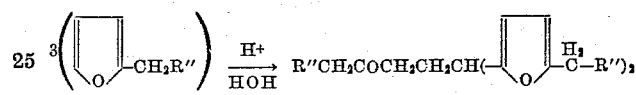

wherein R″ represents hydrogen or substituted or unsubstituted alkyl, aryl, or alkyl-aryl groups. (Addition of compounds having aldehydic substitutents must be avoided.) Hence, the corresponding furylpropanol and furylpropionic acid are converted to 7,7-bis[5(3-hydroxypropyl)-2-furyl]-4-oxo-heptanol-1 and 7,7-bis[5(2-carboxyethyl)2-furyl]-4-oxo-heptanoic acid, respectively, when contacted with an acid in the presence of water.

In a more specific embodiment of this invention, 2-methylfuran, sulfuric acid, and water are refluxed for periods of several hours. The reaction mixture is allowed to cool. The two resulting phases are separated and the aqueous acidic phase is recycled to a reaction zone. The separated oily phase is neutralized by means of an aqueous alkaline wash and/or a water wash. Sodium and/or potassium hydroxides and/or carbonate at about 5% to 10% by weight concentrations are examples of suitable aqueous alkaline wash solutions. A non-alkaline water wash is entirely satisfactory. However, if a base is used to neutralize the oily layer it is preferred that the neutralized oily layer be washed with water until the final wash water is neutral to litmus. Neutralization of the reaction medium, and/or of the oily layer prior to distillation, is optional, but preferred. The product, Compound I, is surprisingly stable in hot acidic solution. However, some loss in yield occurs if the neutralization step prior to distillation is omitted. The neutral oily layer obtained by the above preferred embodiment is then distilled under reduced pressure. In this embodiment some unreacted 2-methylfuran is usually the first to be distilled from the crude product and may be recycled to a reaction zone without further purification. Material distilling in the temperature range of about 100° C. to 110° C. at 0.25 mm. Hg (Compound I) is then collected. Compound I can be further purified, e.g. by subsequent redistillation at reduced pressure. Higher boiling residues remaining in the still may account for some 10% to 15% of the 2-methylfuran charged to the reaction zones. The procedures used in this embodiment are applicable to embodiments using other 2-alkylfurans as well.

The invention is further illustrated by, but not restricted by, the following examples. Parts and percentages are by weight unless otherwise specified.

*Example 1*

Preparation of 5,5-bis(2-methyl-5-furyl)pentanone-2: Water (500 parts), 2-methylfuran (82 parts) and concentrated sulfuric acid (160 parts) were heated under reflux conditions (about 63° C.) for two hours. After cooling to room temperature, two phases were observed and were separated by decantation. The separated upper or oily phase was then repeatedly washed with water until neutral to litmus. Distillation of the resulting neutral oily phase removed some unreacted 2-methylfuran. The material distilling between 100° C. and 110° C. at 0.25 mm. Hg was subsequently further purified by redistillation under reduced pressure, and the product thereby obtained amounted to approximately 70% yield based on the weight of 2-methylfuran charged to the reactor. The yield based on 2-methylfuran actually converted amounted to aproximately 87%. Unknown materials distilling above 110° C. at 0.25 mm. Hg remaining in the still amounted to 12% of the 2-methylfuran charged to the reactor. The purified product from the above process has the following physical properties: B.P. 108° C./0.25 mm.; Sp. gr. 20/20 1.0697; $n_D^{23}$ 1.5050; in the infrared spectra it exhibits very strong bands at 5.8 and 12.8 microns. The infrared band at 5.8 is characteristic of the carbonyl, and the strong broad band found at 12.8 is characteristic of the 2,5-disubstituted furan structure. The product from Example 1 also gave a postive haloform test. A purified sample of the product showed the following elemental analysis: 72.89% C; 7.41% H, as compared to theoretical values of 73.15% C and 7.36% H. The identification was further confirmed through the preparation of the following three derivatives of the purified product. The 2,4-dinitrophenylhydrazone derivative of the product, which melted at 115–116° C., was found to contain 59.08% C, 5.13% H, and 12.83% N as compared to the theoretical values which are 59.14% C, 5.20% H, and 13.14% N. The semicarbazone derivative of the product which melted at 162–163° C. was found to contain 63.35% C, 6.96% H, and 13.67% N as compared to the theoretical values, which are 63.34% C, 6.98% H, and 13.85% N. The hydantoin derivative of the product, which melted at 131.5–132.5° C., was found to contain 64.38% C, 6.46% H, and 8.82% N, as compared to the theoretical values, which are 64.54% C, 6.37% H, and 8.86%N. Hence, all the data are consistent with the structural formula given for Compound I. Compound I is very slightly soluble in water.

The procedure of Example 1 can also be used to prepare compounds of Formula A from corresponding 2-alkyl substituted furan compounds. It becomes increasingly difficult to purify the very high boiling compounds of Formula A by distillation of the compound. Recovery of the higher boiling compounds of Formula A comprises separation from an aqueous phase, and distilling away lower boiling impurities.

Example 2

Ten parts of Raney nickel and 50 parts of Compound I produced in Example 1 were admixed with 300 parts of ethanol in a pressure reactor. This admixture was subjected to 150° C. and an initial hydrogen pressure of 2000 p.s.i.g. After completion of hydrogen uptake as determined by steady hydrogen pressure, the reaction mixture was removed from the vessel and was found to be colorless. The mixture was then filtered and the solvent removed from the filtrate by flash distillation. The residue therefrom was distilled under reduced pressure and a substantially quantitative yield of Compound II was thereby obtained. Pure Compound II, produced by the process of this invention, boils at 110° C./0.2 mm. Hg and shows no infrared absorption at 5.8, indicating absence of carbonyl. Furthermore, absence of infrared absorption at 6.2 microns indicates absence of carbon-carbon unsaturation. The absence of the strong broad band at 12.8 further substantiates the hydrogenation of both furan rings. The strong infrared band at 2.95 microns verifies the hydroxyl structure. All the infrared data are consistent with the structural formula of Compound II.

The stearate of Compound II, i.e., 5,5-bis(5-methyl-tetrahydro-2-furyl)pentanyl-2-stearate, was prepared by heating equimolar quantities of stearic acid and Compound II at temperatures of about 200° C. and distilling off the theoretical amount of water. This stearate is a semisolid at room temperature, and has utility as a lubricant.

When compounds having Formula A are hydrogenated, for example, by a procedure similar to the procedure of Example 2, the following change occurs:

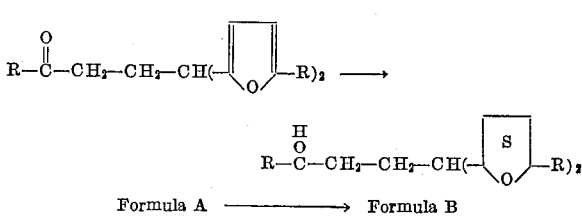

Formula A ⟶ Formula B

Hence, the corresponding novel saturated alcohol of Formula B is produced. Obviously distillation of very high boiling saturated alcohols becomes virtually impossible. However, distillation is usually unnecessary, since compounds of Formula B produced in this manner can be used directly to produce esters, etc., provided the hydrogen reaction was carried to completion.

Example 3

The procedure of Example 1 is followed except that 30 parts of 2-methylfuran and 60 parts of furan were used instead of the 82 parts of 2-methylfuran. 5,5-bis(2-furyl)pentane-2-one along with Compound I is recovered from the product.

Alternately the compound 5,5-bis(2-furyl)pentane-2-one may be prepared by refluxing levulinaldehyde (0.17 moles), furan (1.5 mole), 70% phosphoric acid(36.5), and 300 mls. benzene for about 6 hours. The product is then obtained by neutralization of the reaction mixture followed by distillation in vacuo of the benzene layer.

The 5,5-bis(2-furyl)pentane-2-one had a boiling point of 90–96° C. (0.23 mm. Hg) and two strong bands in the infrared spectrum at 12.42 and 13.65 microns. Its orange 2,4-dinitro-phenylhydrazone derivative was recrystallized from 95% ethanol and then found to have a melting point of 104–106° C. This recrystallized derivative was found to contain 57.42% C, 4.68% H, and 14.04% N as compared to theoretical analysis of $C_{19}H_{18}O_6N_2$ which is 57.28% C, 4.55% H, and 14.07% N. The colorless semicarbazone derivative was recrystallized from 50% ethanol and then found to have a melting point of 166–167° C. This recrystallized semicarbazone derivative was found to contain 61.13% C, 6.13% H, and 15.21% N as compared to the theoretical values for $C_{14}H_{17}O_3N_3$ which are 61.07% C, 6.23% H, and 15.26% N.

Compounds having Formula A react with aldehydes by way of active hydrogens. With formaldehyde, for example, a polyol is thereby obtained. This polyol is useful in modifying solvency and compatibility characteristics of polyester, alkyd and other resins when incorporated therein using any of the well-known procedures. Alkaline catalysts are preferred for incorporating the polyol into polyester. Compounds having Formula A are also excellent epoxy solvents. For example, Compound I is an excellent solvent for Epon 828, Versamid 125, and diethylenetriamine.

As indicated earlier, compounds having Formula A are readily hydrogenated, for example, by procedures similar to Example 2, to the corresponding saturated alcohols having Formula B. The phthalate adipate and sebacate esters of alcohols of Formula B are useful as very high boiling plasticizers having exceptional solvency in polyvinylchloride resins.

Moreover, upon treatment with epichlorohydrin, using any of the well-known coupling procedures, the alcohols of Formula B produce glycidal ethers.

Alcohols of Formula B are used directly or in the form of the glycidal ether with 1,2-epoxides in the well-known 1,2-epoxy polymerization procedures, to produce modifications of the solvency and compatibility characteristics of the resulting resin. Use of alkaline catalysts with compounds of Formula B during esterification and epoxy addition reactions is preferred. It is also preferred that the esterification and epoxy addition reactions be performed immediately after the production of compound of Formula B. Use of alkaline catalyst and freshly prepared compound of Formula B aids in obtaining esters and adducts of low color.

Compounds II and III are useful solvents for a wide variety of materials. Esters of the novel acids, Compounds IV and V, are useful as high-boiling plasticizers, especially in polyvinylchloride resins. Likewise the esters of Compounds II and III are useful as plasticizers of polyvinylchloride.

We claim:
1. A compound having the formula

wherein R is lower alkyl having less than 5 carbons and R' is selected from the class consisting of hydrogen and lower alkyl having less than 5 carbons.
2. 5,5-bis(2-furyl)pentane-2-one.
3. 5,5-bis(5-methyl-2-furyl)pentane-2-one.
4. 5,5 - bis(5 - methyltetrahydro - 2 - furyl)pentanyl- 2 - stearate.

References Cited by the Examiner
UNITED STATES PATENTS
2,681,917   6/1954   Fangue _____ 260—247.8

OTHER REFERENCES

Adkins, H.: Reactions of Hydrogen with Organic Compounds over Copper-Chromium Oxide and Nickel Catalysts. The Univ. of Wisconsin Press, 1937 (pp. 62–64 and 136–137).

Dunlop et al.: Furans, Reinhold, 1953 (pp. 640–658).

Paul et al.: Bull. Soc. Chim. (France), 1961, pp. 2139, 2140, and 2143.

ALEX MAZEL, *Primary Examiner.*

HENRY R. JILES, *Examiner.*

J. H. TURNIPSEED, *Assistant Examiner.*